United States Patent
Jang et al.

(10) Patent No.: US 11,979,111 B2
(45) Date of Patent: May 7, 2024

(54) DC-DC CONVERTER FOR SOLAR-RELATED ENERGY STORAGE SYSTEM, AND CONTROL METHOD THEREOF

(71) Applicant: LG INNOTEK CO., LTD., Seoul (KR)

(72) Inventors: Ju Young Jang, Seoul (KR); Jeong Heum Lee, Seoul (KR); Ui Seon Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 789 days.

(21) Appl. No.: 17/054,294

(22) PCT Filed: Oct. 26, 2018

(86) PCT No.: PCT/KR2018/012803
§ 371 (c)(1),
(2) Date: Nov. 10, 2020

(87) PCT Pub. No.: WO2019/231061
PCT Pub. Date: Dec. 5, 2019

(65) Prior Publication Data
US 2021/0242830 A1 Aug. 5, 2021

(30) Foreign Application Priority Data
Jun. 1, 2018 (KR) .......... 10-2018-0063196

(51) Int. Cl.
*H01M 10/44* (2006.01)
*H01M 10/46* (2006.01)
(Continued)

(52) U.S. Cl.
CPC ............ *H02S 40/38* (2014.12); *H02J 3/381* (2013.01); *H02J 7/00712* (2020.01); *H02J 2300/24* (2020.01)

(58) Field of Classification Search
CPC ...... H02J 7/00712; H02J 7/00306; H02J 7/35; H02J 7/0031; H02J 2300/24; H02J 3/381
(Continued)

(56) References Cited

U.S. PATENT DOCUMENTS

| 2010/0085016 A1* | 4/2010 | Kim ............... H02J 7/0031 320/136 |
| 2013/0113427 A1 | 5/2013 | Noda et al. |
| 2016/0204649 A1 | 7/2016 | Kim et al. |

FOREIGN PATENT DOCUMENTS

| JP | 2010-93953 A | 4/2010 |
| JP | 2011-203990 A | 10/2011 |

(Continued)

OTHER PUBLICATIONS

Translation of KR 10-1538498 B1 (Jul. 22, 2015) (Year: 2015).*

*Primary Examiner* — Edward Tso
(74) *Attorney, Agent, or Firm* — Birch, Stewart, Kolasch & Birch, LLP

(57) ABSTRACT

One embodiment discloses a DC-DC converter which, in a solar-related energy storage system, cuts-off the over-discharging of a battery, and a control method thereof. Specifically, disclosed are a DC-DC converter which protects a battery by appropriately switching between a sleep mode which minimizes battery consumption by maintaining only minimized functions and a cut-off mode which prevents the battery from over-discharging by physically cutting off a circuit connected to the battery, and a control method thereof.

18 Claims, 9 Drawing Sheets

(51) Int. Cl.
*H02J 3/38* (2006.01)
*H02J 7/00* (2006.01)
*H02S 40/38* (2014.01)

(58) Field of Classification Search
USPC ................ 320/101, 107, 125, 132, 135, 136
See application file for complete search history.

(56) References Cited

FOREIGN PATENT DOCUMENTS

| | | |
|---|---|---|
| JP | 2015-12638 A | 1/2015 |
| JP | 2017-85867 A | 5/2017 |
| KR | 10-2010-0038956 A | 4/2010 |
| KR | 10-2013-0007258 A | 1/2013 |
| KR | 10-1538498 B1 | 7/2015 |
| KR | 10-2017-0217245 A | 11/2017 |
| KR | 10-1799461 B1 | 11/2017 |

\* cited by examiner

DC-DC CONVERTER FOR SOLAR-RELATED ENERGY STORAGE SYSTEM, AND CONTROL METHOD THEREOF

CROSS REFERENCE TO RELATED APPLICATIONS

This application is the National Phase of PCT International Application No. PCT/KR2018/012803, filed on Oct. 26, 2018, which claims priority under 35 U.S.C. 119(a) to Patent Application No. 10-2018-0063196, filed in the Republic of Korea on Jun. 1, 2018, all of which are hereby expressly incorporated by reference into the present application.

TECHNICAL FIELD

In the present disclosure, a DC-DC converter which, in a solar-related energy storage system, cuts-off the over-discharging of a battery, and a control method thereof.

BACKGROUND ART

Recently, as awareness of environmental protection has been increased, interest in a method of generating electricity without discharging pollutants such as carbon dioxide has been emerged. In particular, in the case of a power generation system using solar light, the development and installation cost of the technology becomes cheaper powered by the technological advancement, and the supply is gradually expanding.

In such a solar power generation system, a plurality of solar cells is assembled to form a plurality of photovoltaic modules. The DC power generated from the plurality of photovoltaic modules is converted to AC power through an inverter, and thus, it can be immediately used in industrial facilities.

Meanwhile, in the case of solar power generation, a gap in power generation, during which sufficient power generation is not achieved due to night time when solar light is unavailable or changes in weather, occurs inevitably. Therefore, in order to compensate for such disadvantages, a solar power generation system is essentially equipped with a battery to enable stable power supply.

However, in the case of a battery, when an over-discharging occurs due to the solar power generation environment and electricity consumption, a case of unrecoverable damage occurs. Therefore, many efforts have been made to prevent over-discharging of the battery in an energy storage system related to a solar power generation system.

DETAILED DESCRIPTION OF THE INVENTION

Technical Subject

The present disclosure may disclose a DC-DC converter which, in a solar-related energy storage system, cuts-off the over-discharging of a battery, and a control method thereof. Specifically, disclosed are a DC-DC converter which protects a battery by appropriately switching between a sleep mode which minimizes battery consumption by maintaining only minimized functions and a cut-off mode which prevents the battery from over-discharging by physically cutting off a circuit connected to the battery, and a control method thereof. Of course, the technical problem to be solved is not limited to the technical problems as described above, and various technical problems may be further included within the scope that is apparent to a person skilled in the art.

Technical Solution

A DC-DC converter according to the first aspect may comprise: an input unit that receives power; an output unit that converts the power of the input unit and supplies it to a battery; a processor that determines a mode according to a state of the battery; and a circuit breaker that electrically connects to or disconnects from the battery according to the mode, wherein the processor measures a first remaining amount value of the battery in a first operation mode, the first operation mode is switched to a sleep mode when the first remaining amount value is less than or equal to a first value, the second operation mode is switched from the sleep mode to a second operation mode to measure a second remaining amount value of the battery, the second operation mode is switched to a cut-off mode when the second remaining amount value is less than or equal to a second value, and the circuit breaker may electrically separate the battery from the output unit in the cut-off mode of the processor.

Also, the second value may be smaller than the first value.

In addition, in the second operation mode, it may be switched to the sleep mode when the second remaining amount value of the battery is greater than the second value and less than or equal to the first value.

In addition, in the first operation mode, the DC-DC converter may be switched to the cut-off mode when the first remaining amount value of the battery is less than or equal to the second value.

In addition, in the second operation mode, the DC-DC converter may be switched to the first operation mode when the second remaining amount value of the battery is greater than the first value.

In addition, the sleep mode can reduce power consumption by deactivating functions other than a function required for communication with an inverter among a plurality of functions activated in the first operation mode.

In addition, the processor is switched to the first operation mode and can supply power to the battery when the current state is a state in which the battery can be charged through communication with the inverter while the battery is operating in the sleep mode or the cut-off mode.

In addition, the processor may determine the current state as a state in which the battery can be charged when more than a predetermined amount of power is supplied from the solar power supply.

In addition, the processor may switch the state of the circuit breaker in cut-off state into a connected state to supply power to the battery when the current state is a state in which the battery can be charged while operating in the cut-off mode.

In addition, the processor may switch from the sleep mode to a second operation mode according to a preset time interval.

In addition, the second value may be a remaining amount value of the battery when the displayed remaining amount value of the battery is 0.

In addition, the second operation mode may be a mode in which at least one of an analog-digital converter (ADC) sensing function, a pulse width modulation (PWM) function, and a protection function is deactivated.

In addition, a method for controlling a DC-DC converter according to a second aspect may comprise the steps of: determining a first remaining amount value of a battery in a first operation mode; switching the first operation mode to a sleep mode when the first remaining amount value is less than or equal to a first value; switching from the sleep mode to a second operation mode and measuring a second remaining amount of the battery; switching the second operation mode to a cut-off mode when the second remaining amount value is less than or equal to a second value; and electrically separating the battery, wherein the second value may be smaller than the first value.

In addition, the third aspect can provide a computer-readable recording medium in which a program for executing the method of the second aspect on a computer is recorded.

Advantageous Effects

The present disclosure may provide a DC-DC converter which, in a solar-related energy storage system, cuts-off the over-discharging of a battery, and a control method thereof.

BEST MODE

As for terms used in the embodiments, general terms that are currently widely used as possible are selected while considering functions in the present invention, but this may vary according to the intention of a technician working in the art or precedent, the emergence of new technologies, and the like. In addition, in certain cases, there are terms arbitrarily selected by the applicant, and in this case, the meaning of the terms will be described in detail in the description of the corresponding invention. Therefore, the terms used in the present invention should be defined based on the meaning of the term and the overall contents of the present invention, not a simple name of the term.

When a certain part of the specification is said to "comprise" a certain element, it means that other elements may be further included rather than excluding other elements unless specifically stated to the contrary. In addition, the terms " . . . unit", " . . . module", and the like refer to a unit that processes at least one function or operation, which may be implemented as hardware or software, or a combination of hardware and software.

Hereinafter, embodiments of the present invention will be described in detail with reference to the accompanying drawings so that an ordinary person skilled in the art may easily implement the present invention. However, the present invention may be implemented in various different forms and is not limited to the embodiments described herein.

Hereinafter, exemplary embodiments of the present invention will be described in detail with reference to the drawings.

Figure 1:
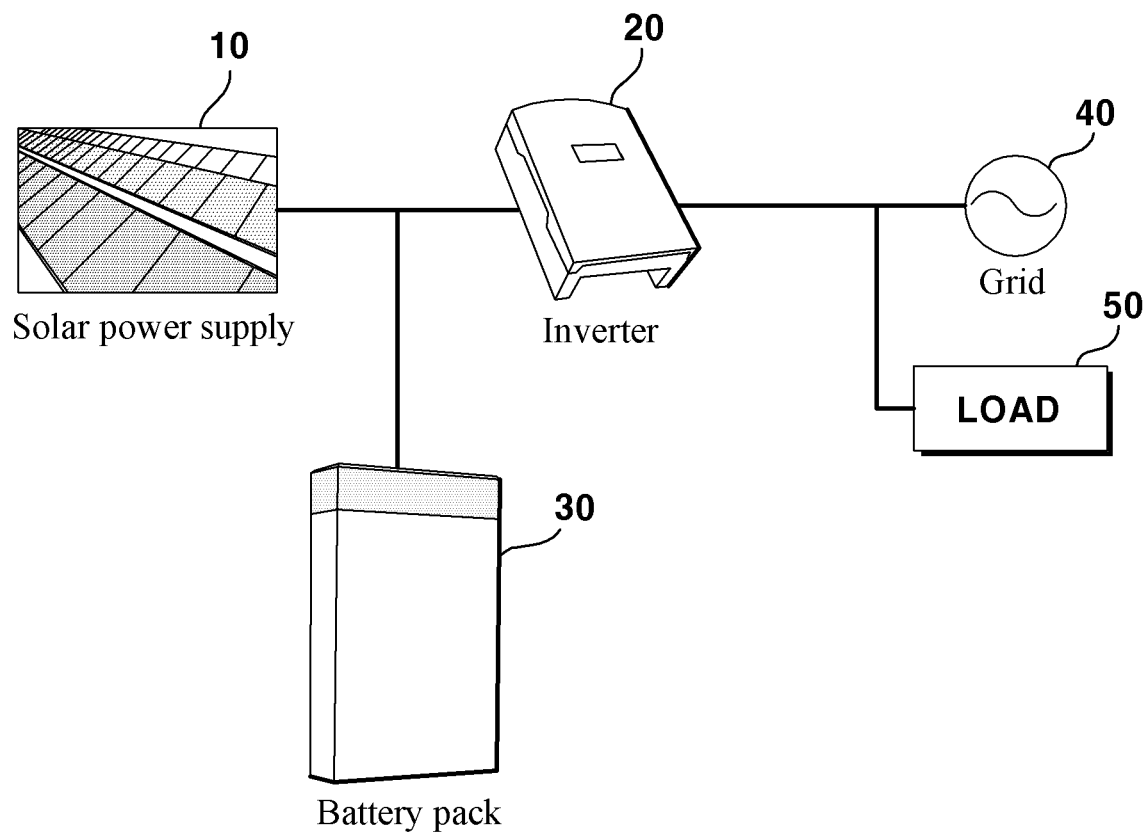
FIG. 1 is a diagram illustrating a solar-related energy storage system according to an embodiment.

FIG. 1 is a diagram illustrating a solar power generation system according to an exemplary embodiment. The solar-related energy storage system may be an example of a solar power generation system.

As illustrated in FIG. 1, the solar power generation system may comprise a solar power supply 10, an inverter 20, a battery pack 30, and a load 50.

However, it can be understood by an ordinary person skilled in the art that other general-purpose components other than the components shown in FIG. 1 may be further included in the solar power generation system. For example, the solar power generation system may further include a power grid, 40. Alternatively, according to another embodiment, it may be understood by an ordinary person skilled in the art that some of the components illustrated in FIG. 1 may be omitted.

The solar power supply 10 according to an embodiment may be composed of a plurality of photovoltaic modules in which photovoltaic cells are assembled, and a photovoltaic cell formed by bonding a p-type semiconductor and an n-type semiconductor generates electricity with light. Specifically, when a light is irradiated on a photovoltaic cell, electrons and holes are generated therein. The generated charges are moved to the P and N poles, respectively, and by this action, a potential difference occurs between the P and N poles, and at this time, when a load is connected to the photovoltaic cell a current flows. Here, the photovoltaic cell refers to the smallest unit that generates electricity, and the photovoltaic cells are gathered to form a photovoltaic module, and the photovoltaic module may form an array connected in series/parallel to form a solar power supply 10.

In order to supply a power to the power grid 40 or the load 50, the inverter 20 according to an embodiment may convert a direct current (DC) power generated by the solar power supply 10 by the photoelectric effect to an alternating current (AC) power. Here, the power grid 40 may refer to a grid for transmitting and distributing power produced by the solar power generation system. Meanwhile, the amount of power generated by the solar power supply 10 is continuously changed by temporal factors such as sunrise and sunset, or external factors such as weather and the like. Therefore, the inverter 20 controls the voltage generated from the solar power supply 10 to find the maximum power and supply it to the power grid 40. At this time, when a case occurs in that the power for operating the inverter is lower than the output power of the inverter, the inverter 20 may consume the power of the power grid 40 in reverse. Of course, in this case, the inverter may prevent power from being reversed by blocking the power flowing into the power grid 40. Accordingly, various optimal control methods for extracting maximum power from the solar power supply 10 are applied to the solar power generation system so that the above-described operation of the inverter 20 can be performed more efficiently.

As a representative maximum power point (MPP) method of the solar power supply 10, there are a perturbation and observation (PO) method, an incremental conductance (IC) control method, a constant voltage (CV) control method, and the like. Here, the PO method is a method of periodically measuring the voltage and current of the solar power supply 10 to calculate power and then tracking the MPP using the power value. The IC control method is a method of measuring the voltage and current generated from the solar power supply 10 so that the rate of change of the power with respect to the change of the operating point of the terminal voltage of the array becomes '0'. The CV control method is a method of controlling the solar power supply 10 with a constant reference voltage (refV) regardless of the operating voltage or power of the array. According to each optimal control method, a power source input from the solar power supply 10 to the inverter may operate as a voltage source or a current source.

The load 50 according to an embodiment may refer to a product using an electricity type used in real life. For example, the inverter 20 may obtain AC power of a desired voltage and frequency through an appropriate conversion method, a switching element, or a control circuit, and supply electricity to home appliances in general homes or machinery products in industrial facilities.

In addition, in the case of solar power generation, a gap in power generation, during which sufficient power generation is not achieved due to night time when solar light is unavailable or changes in weather, occurs inevitably. Therefore, in order to compensate for such disadvantages, the solar power generation system is essentially equipped with a battery to enable stable power supply.

A battery pack 30 according to an embodiment may comprise at least one of a converter, a battery pack, a battery management system (BMS), and a battery control circuit.

The battery may be composed of a lithium ion battery or a nickel hydrogen battery, but is not necessarily limited to this configuration, and may refer to a battery that can be used semi-permanently through charging.

DC-DC converter is a device that can convert DC power produced through the solar power supply 10 into DC power suitable for a battery. In general, a power is converted in a way that a DC power is converted into an AC power and then the AC power is reverse converted to a DC power.

The battery management system (BMS) may provide a function of misuse protection of cells constituting the battery, balancing between unit cells, measuring the remaining amount of the charge (SOC), temperature maintenance management, or system monitoring function. Therefore, based on a sensor measuring the state of the cell and a function of receiving the measured value of the sensor and transmitting it to the control system of the applied product, it is possible to build and control circuits that generate an abnormal signal when the temperature and charging state and the like of the system exceed the set value and cut-off and open the power circuit between cells.

Meanwhile, the inverter 20 and the battery pack 30 may further comprise a display device (not shown). For example, the user can check the supply and demand status of the power of the solar panel, reverse wiring, sleep mode operation, or the state of charge of the battery through the display device. Meanwhile, the display device may be a liquid crystal display, a thin film transistor-liquid crystal display, an organic light-emitting diode, a flexible display, a three dimensional (3D) display, an electrophoretic display, or the like. In addition, the display device may comprise two or more displays depending on the implementation type. In addition, when the touch pad of the display has a layer structure and is configured as a touch screen, the display may also be used as an input device in addition to an output device.

In addition, the inverter 20 and the battery pack 30 may communicate with each other through wired communication or wireless communication. For example, the inverter 20 and the battery pack 30 may comprise a Wi-Fi chip, a Bluetooth chip, a wireless communication chip, an NFC chip, or the like. Of course, the inverter 20 and the battery pack 30 may communicate with each other using various external devices using a Wi-Fi chip, a Bluetooth chip, a wireless communication chip, an NFC chip, and the like. The Wi-Fi chip and the Bluetooth chip can perform communication using a Wi-Fi method and a Bluetooth method, respectively. In the case of using a Wi-Fi chip or a Bluetooth chip, various types of connection information such as SSID, session key, and the like are first transmitted and received, and by using this, communication is connected and then various types of information may be transmitted and received. The wireless communication chip may perform communication according to various communication standards such as IEEE, Zigbee, 3rd Generation (3G), 3rd Generation Partnership Project (3GPP), Long Term Evolution (LTE), and the like. The NFC chip can operate in a Near Field Communication (NFC) method using a 13.56 MHz band among various RF-ID frequency bands such as 135 kHz, 13.56 MHz, 433 MHz, 860 to 960 MHz, 2.45 GHz, and the like.

Meanwhile, in the case of a solar power generation system, a solar-related energy storage system can be constructed using the battery pack 30 described above. However, in the case of a battery included therein, when an over-discharging occurs due to the solar power generation environment and electricity consumption, a case of unrecoverable damage occurs.

Accordingly, in the solar energy storage system according to an embodiment, in order to prevent over-discharging of the battery, when a remaining amount value (SOC) of a battery is less than or equal to a first value, the battery is switched to a sleep mode in which some functions are deactivated to minimize battery power consumption, and when the remaining amount of the battery is less than or equal to a second value, the battery may be physically separated thereby preventing over-discharging of the battery.

Hereinafter, a solar-related energy storage system for preventing over-discharging of a battery will be described in detail.

Figure 2:
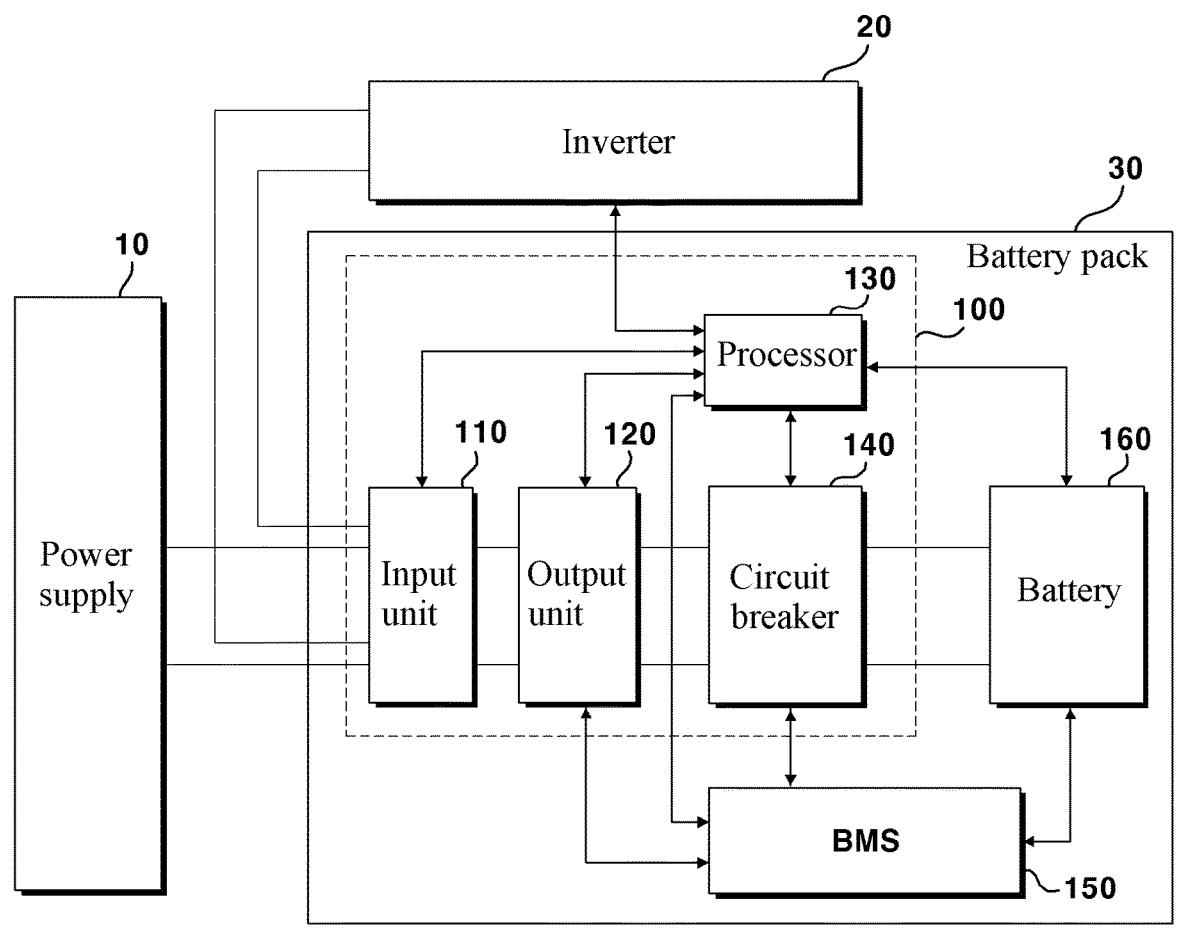
FIG. 2 is a block diagram illustrating in detail a solar-related energy storage system according to an embodiment.

FIG. 2 is a block diagram illustrating in detail a solar-related energy storage system according to an exemplary embodiment.

Referring to FIG. 2, a solar-related energy storage system according to an embodiment may comprise a solar power supply 10, an inverter 20, and a battery pack 30. In addition, the battery pack 30 may comprise a DC-DC converter 100, a BMS 150, and a battery 160, wherein the DC-DC converter 100 comprises an input unit 110, an output unit 120, a processor 130, and a circuit breaker 140. However, this is one embodiment, and the DC-DC converter 100 may comprise the BMS 150 as a constituting element thereof.

Specifically, the input unit 110 receives power from the solar power supply 10.

The output unit 120 converts the power of the input unit 110 and supplies it to the battery 160. For example, DC power input through the input unit 110 may be temporarily converted to AC, and then converted back to DC power of a desired voltage and output to the battery 160. Of course, when the power of the battery 160 is supplied to the inverter 20, the input unit 110 and the output unit 120 may perform opposite functions.

The processor 130 may determine an operation mode according to the state of the battery. Here, the operation mode may comprise a first operation mode, a sleep mode, a second operation mode, and a cut-off mode. For example, during normal operation, the battery pack 30 is operated in a first operation mode in which power is supplied to the inverter 20 using all functions of the battery pack or is charged with power input from the solar power supply 10. However, in the case when the level of the remaining amount (SOC) of the battery is less than or equal to a first value in a state where there is no charge from the solar power supply 10, such as in winter, night, or bad weather in Europe, and the like, the processor 130 controls the battery 160 to switch to the sleep mode to prevent continued consumption of the battery.

For example, the processor 130 may measure a first remaining amount value of the battery 160 in a first operation mode, and switch the first operation mode to a sleep mode when the first remaining amount value is less than or equal to a first value. Here, the first remaining amount value means a value measured in the first operation mode, and the first value may mean that the remaining amount of the charge of the battery obtained through BMS is less than 5%. In addition, the sleep mode here may be a mode for reducing power consumption by deactivating functions other than functions required for communication with the inverter among a plurality of functions activated in the first operation mode.

The processor 130 may switch from the sleep mode to a second operation mode to measure a second value of the battery, and switch the second operation mode to a cut-off mode when a second remaining amount value is less than or equal to the second value. Here, the second remaining amount value means a value measured in the second operation mode, and the second value is less than a first value. In addition, the second operation mode is a mode in which at least one of an analog-digital converter (ADC) sensing function, a pulse width modulation (PWM) function, and a protection function is deactivated.

For example, a second value may mean that the remaining amount of the charge of the battery obtained through BMS is 0% or less. Here, it is considered that a second value of 0% is designed to be displayed to a user as 0% when an actual remaining amount of about 3% is remained in order to prevent complete discharge of the battery.

In addition, in a second operation mode, the processor 130 may switch to a sleep mode when a second remaining amount value of the battery 160 is greater than a second value and less than or equal a first value. For example, the DC-DC converter 100 may determine whether to continuously maintain the sleep mode based on the remaining amount of charge of the battery obtained through the BMS in the second operation mode.

In addition, in a first mode, the processor 130 may switch to a cut-off mode when a first remaining amount of the battery is less than or equal to a second value. For example, the DC-DC converter 100 may skip a sleep mode in a first mode and immediately switch to a cut-off mode.

Also, in a second operation mode, the processor 130 may switch to a first operation mode when a second remaining amount value of the battery is greater than a first value. For example, the processor 130 may determine that the battery 160 is in a state in which charging is possible, and may supply power to the battery 160 by switching to a first operation mode.

In addition, when it is determined that a solar-related energy storage system is in a state in which the battery is chargeable through communication with the inverter while the DC-DC converter 100 is operating in a sleep mode or a cut-off mode, the processor 130 can supply power to the battery by switching to a first operation mode.

For example, since the DC-DC converter 100 maintains communication with the inverter 20 even in the sleep mode, the processor 130 may determine the current state as a state in which the battery can be charged when more than a preset amount of power is supplied from the solar power supply 10.

In addition, while the processor 130 is operating in a cut-off mode, when the current state is a state in which the battery can be charged, the state of the circuit breaker 140 is switched to a connected state so that power can be supplied to the battery 160.

Meanwhile, in the above-described example, a first value and a second value are the exemplary values that can be suggested by the designer to proceed to a sleep mode and a cut-off mode within a range where the second value is smaller than the first value, and the scope of rights is not limited to the above values.

In a processor 130 according to an embodiment, the processor may be implemented as an array of a plurality of logic gates, or a combination of a general-purpose microprocessor and a memory in which a program executable in the microprocessor is stored. In addition, it can be understood by a person of ordinary skill in the art to which the present embodiment pertains that it may be implemented with other types of hardware. In addition, the processor 130 is included in the DC-DC converter 100 in one embodiment, but it may also be installed outside the DC-DC converter 100.

A circuit breaker 140 according to an embodiment may physically separate the battery 160 to cut-off over-discharging of the battery 160 when the remaining amount value of the battery 160 measured in a sleep mode is less than or equal to a preset value. For example, even if the battery 160 is switched to a sleep mode, power may continue to be consumed for some functions (such as an inverter communication function) that are essentially operating. Therefore, when it is determined that a remaining amount of charge received from the BMS is less than 0%, the processor 130 may operate the circuit breaker 140 to prevent an over-discharging of the battery due to continuous battery consumption so that the battery may not be consumed any more. Here, the residual amount value of 0%, which is a reference value for determination, may mean the remaining amount of the battery displayed to the user, but it may mean that the actual battery is in a state in which there is a 3% remaining amount. That is, from the design stage, it is possible to let the remaining amount of charge be displayed as 0% to a user when the minimum remaining battery capacity value for preventing the battery from over-discharging is reached.

The circuit breaker 140 is implemented in the form of a circuit breaker (CB) to physically or electrically block the battery. For example, it may be implemented in the form of a switch, and may be implemented as a two-stage switch to prevent damage to a circuit due to a sudden change in current, or may be implemented as a FET to cut-off only power discharged from the battery 160.

Hereinafter, an operation of a DC-DC converter for a solar-related energy storage system according to an embodiment will be described in detail with reference to FIGS. 3 to 9.

Figure 3:
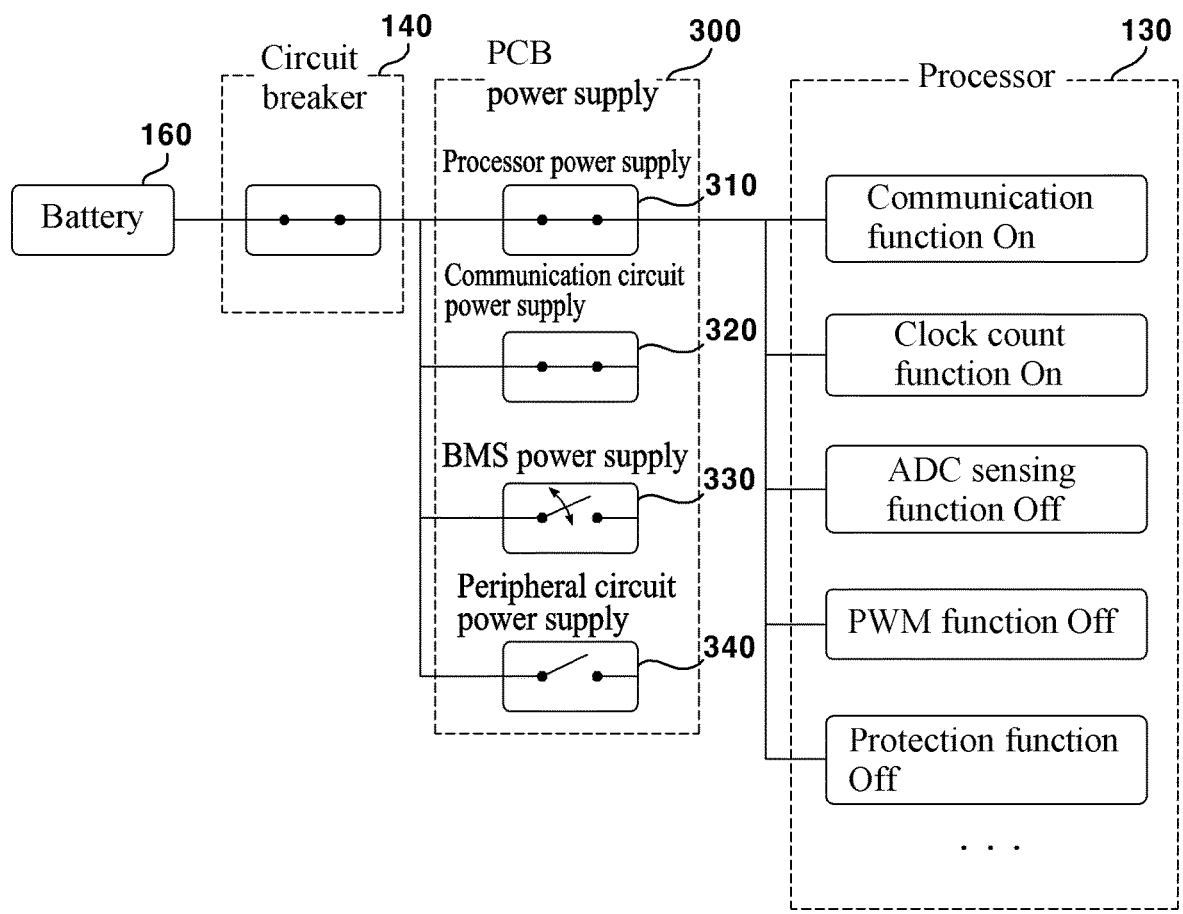
FIG. 3 is a diagram illustrating a sleep mode according to an embodiment.

FIG. 3 is a diagram for describing a sleep mode according to an embodiment.

A DC-DC converter according to an embodiment may comprise a PCB power supply 300. Here, the PCB (Printed Circuit Substrate) may mean a substrate in which a conductor circuit is formed on one insulating substrate based on the design of circuit components. Accordingly, each component of a DC-DC converter 100 according to an embodiment may configure the PCB power supply 300 so that a circuit is designed based on a PCB and power is inputted for each circuit. For example, the PCB power supply 300 may comprise a processor power supply 310, a communication circuit power supply 320, a BMS power supply 330, and other peripheral circuit power supply 340. Meanwhile, when the DC-DC converter 100 is switched to a sleep mode according to an embodiment, power for some functions among the PCB power supply 300 may be cut-off in order to minimize the consumption of the battery 160. For example, the power of the BMS power supply 330 and the peripheral circuit power supply 340, which consume relatively high battery power, are cut-off, and only the processor power supply 310 for controlling the DC-DC converter 100 and the communication circuit power supply 320 for maintaining communication with the inverter 20 and the like may be maintained.

In addition, a DC-DC converter 100 according to an embodiment may prevent additional power loss by terminating (turning off) some functions of the processor 130 being operated according to an input of the processor power supply 310. For example, in a sleep mode, at least one or more of the functions (ADC sensing function, PWM function, and protection function) except a function for communicating with the inverter and a clock count function may be deactivated. Here, the function for communicating with the inverter is maintained in order to wake up from the sleep mode by communicating with the DC-DC converter 100 and switch to a first operation mode later when the solar power supply becomes a state capable of generating a power. In addition, the clock count function may be maintained in an activated state in order to determine when a preset time elapses even in the sleep mode of the DC-DC converter 100 and temporarily operate in a second operation mode.

Meanwhile, as described above, since the BMS power supply 330 is turned off during a sleep mode operation, the DC-DC converter 100 may not be aware of the information on the remaining amount value of the battery. Accordingly, as illustrated in FIG. 4, the DC-DC converter 100 may temporarily turn on only the BMS power supply to check the remaining amount value at each preset time interval and switch to a second operation mode.

Figure 4:
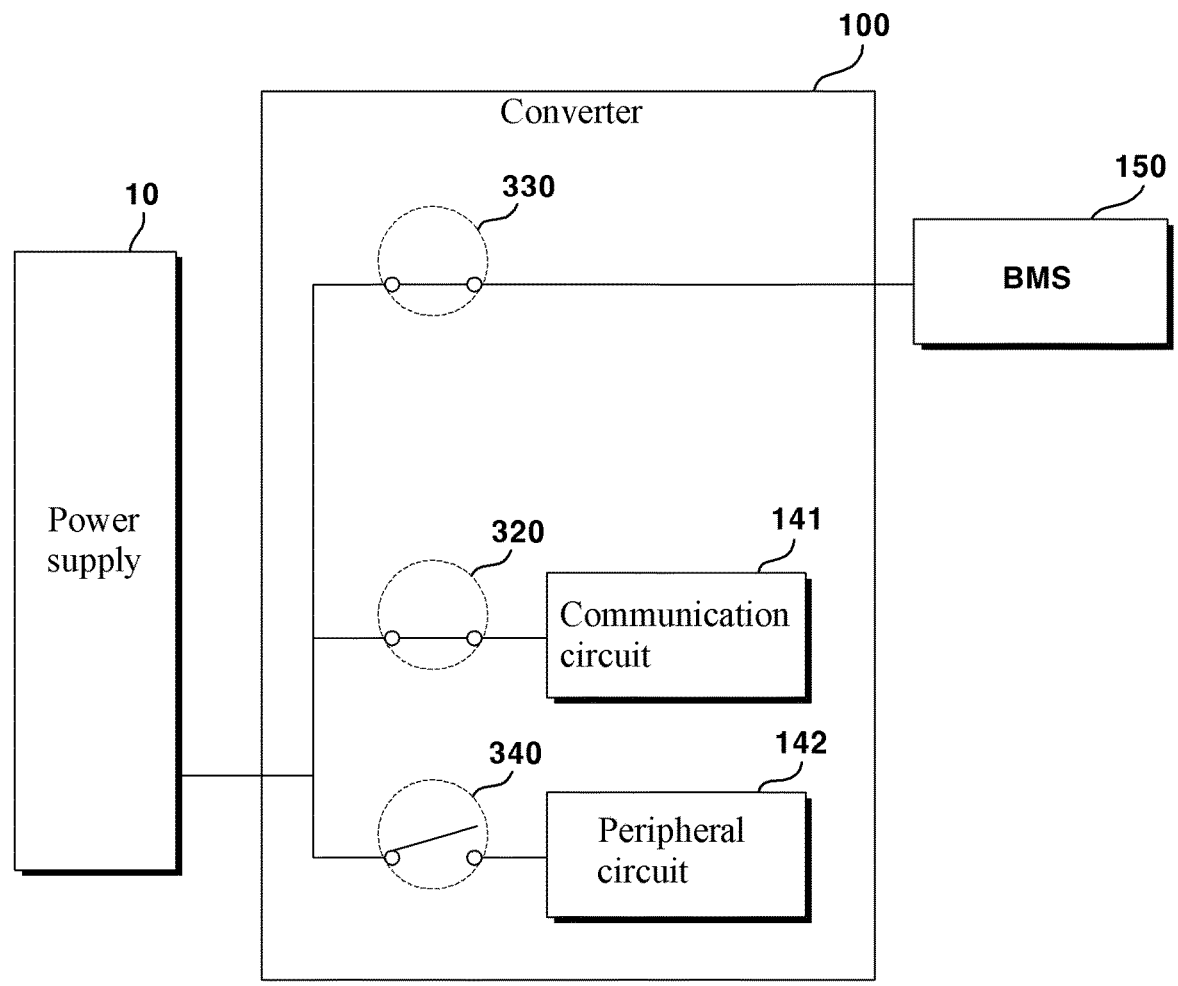
FIG. 4 is a block diagram illustrating a second operation mode according to an embodiment.

FIG. 4 is a block diagram for describing a second operation mode according to an embodiment.

In a second operation mode according to an embodiment, the DC-DC converter 100 may temporarily connect the BMS power supply 330 to receive the BMS 150 information. At this time, the communication circuit power supply 320 connected to the communication circuit 141 for communicating with the inverter still maintains a closed state, and the peripheral circuit power supply 340 connected to a peripheral circuit 142 still maintains an open state so that the power consumption can be minimized. In addition, unlike a first operation mode, in a second operation mode, at least one of an analog-digital converter (ADC) sensing function, a pulse width modulation (PWM) function, and a protection function is deactivated, thereby minimizing the power consumption.

Figure 5:
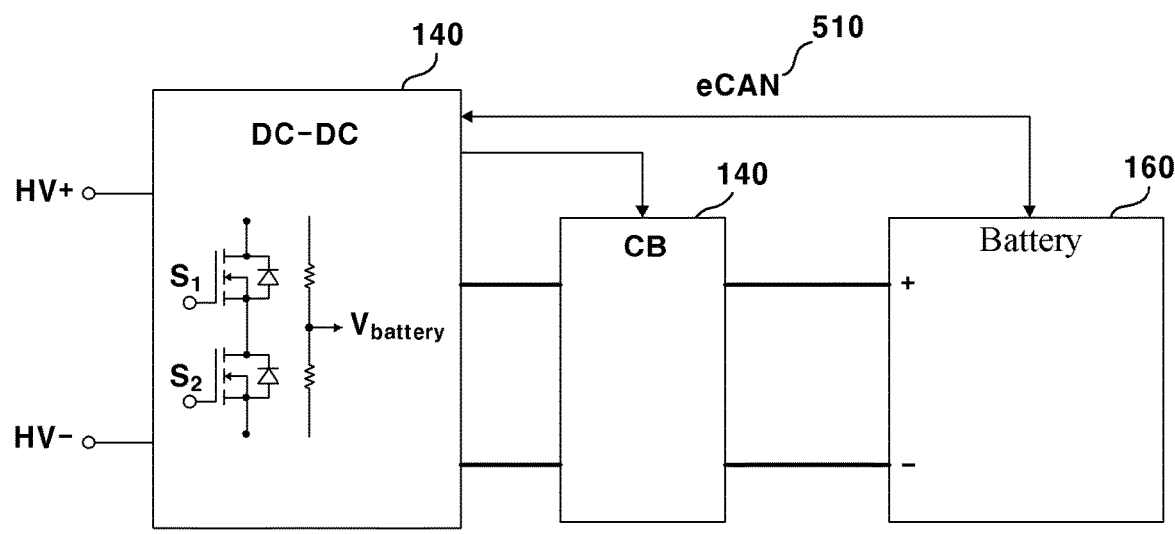
FIG. 5 is a block diagram illustrating a cut-off mode according to an embodiment.

FIG. 5 is a block diagram for describing a cut-off mode according to an embodiment.

Referring to FIG. 5, the DC-DC converter 100 may check the remaining amount charge value using the CAN communication 510 of the BMS at a certain period. In addition, a circuit breaker 140 capable of physically or electrically cutting off the power consumption may be disposed between the DC-DC converter 100 and the battery 160. Accordingly, the DC-DC converter 100 may fundamentally cut-off the power consumption due to the solar-related energy storage system by operating the circuit breaker based on the remaining amount charge value of the battery 160 to protect the battery from over-discharging.

Here, the circuit breaker 140 may be implemented in the form of a circuit breaker (CB) to physically cut-off the battery. For example, it may be implemented in the form of a switch, and may be implemented as a two-stage switch to prevent damage to a circuit due to a rapid current change, or as a FET to cut-off only the power discharged from the battery. The principle that the circuit breaker 140 is implemented as a two-stage switch will be described in detail later in the description of FIG. 8.

Figure 6:
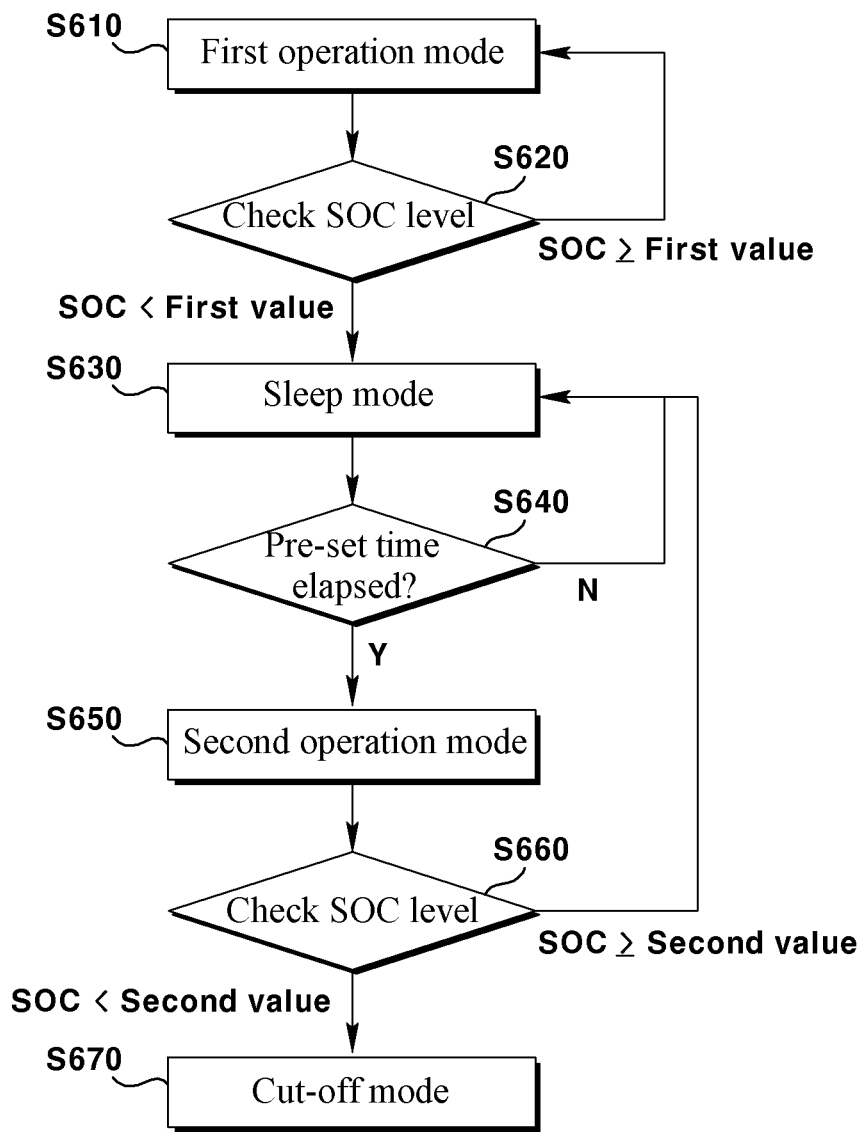
FIG. 6 is a flowchart illustrating an example of switching to a sleep mode and a cut-off mode according to an embodiment.

FIG. 6 is a flowchart for describing an example of switching to a sleep mode and a cut-off mode according to an embodiment.

Referring to FIG. 6, the DC-DC converter 100 checks the level of the remaining amount value (SOC) of the battery, and according to the level of the SOC, it can be operated in one of a first operation mode, a second operation mode, a sleep mode, and a cutoff mode.

In step S610, the DC-DC converter operates in a first operation mode in which power is supplied to a peripheral circuit and the like without limiting power consumption of the battery or a solar power supply is charged with a battery. In the first operation mode, the power supply of the battery is always connected to the BMS, so that level of the SOC of the battery can be checked at any time. The first operation mode may represent a mode in which a normal operation is performed.

In step S620, the DC-DC converter 100 checks the SOC level and, if the SOC level is smaller than the first value, and proceeds to step S630 to switch to a sleep mode. The first value may be predetermined, for example, the first value may be 5%. According to an embodiment, when the DC-DC converter 100 is switched to a sleep mode, power for some functions of the PCB power supply 300 may be cut-off in order to minimize the consumption of the battery 160. For example, the BMS power supply 330 and the peripheral circuit power supply 340, which consume relatively high battery power, are cut-off, and only the processor power supply 310 for controlling the DC-DC converter 100 and the communication circuit power supply 320 for maintaining communication with the inverter 20 and the like may be maintained. In this case, since only power required for communication is consumed, the amount of power consumed may be less than that of a first operation mode. However, since power consumption for communication occurs, an over-discharging of the battery may occur when operating for a sufficiently long time in a sleep mode.

In step S620, if the SOC level is greater than a first value, the DC-DC converter may return to step S610 and continue to maintain a first operation mode.

Meanwhile, in step S640, when a preset time (for example, 6 hours) elapses in a sleep mode state, the DC-DC converter temporarily proceeds to step S650 to switch to a second operation mode, and proceeds to step S660 to check the value (SOC) level again. In the sleep mode, since the battery management system (BMS) is deactivated to minimize power consumption, only the BMS function can be temporarily activated to check the SOC level in the second operation mode.

If the value of the SOC level measured at this time is smaller than a second value, the DC-DC converter proceeds to step S670 to switch to the cut-off mode. Also, when the SOC level is greater than a second value, the DC-DC converter 100 may proceed to step S630 to switch to a sleep mode. At this time, the SOC level is usually smaller than a first value, but may be larger than a second value. Although not illustrated in FIG. 6, when the SOC level is greater than the first value, the DC-DC converter 100 may proceed to step S610 to operate in a first operation mode.

Here, a second value has a value smaller than a first value. For example, the second value may mean that the remaining amount of the charge of the battery obtained through BMS is 0% or less. Here, the second value can be designed to be displayed to a user as 0% when the actual remaining amount of about 3% remains to prevent complete discharge of the battery, and the level of the remaining amount (SOC) value that is displayed to the user as 0% may represent the second value.

Meanwhile, in FIG. 6, it has been described that a sleep mode and a cut-off mode are sequentially performed, but the configuration is not limited thereto.

Figure 7:
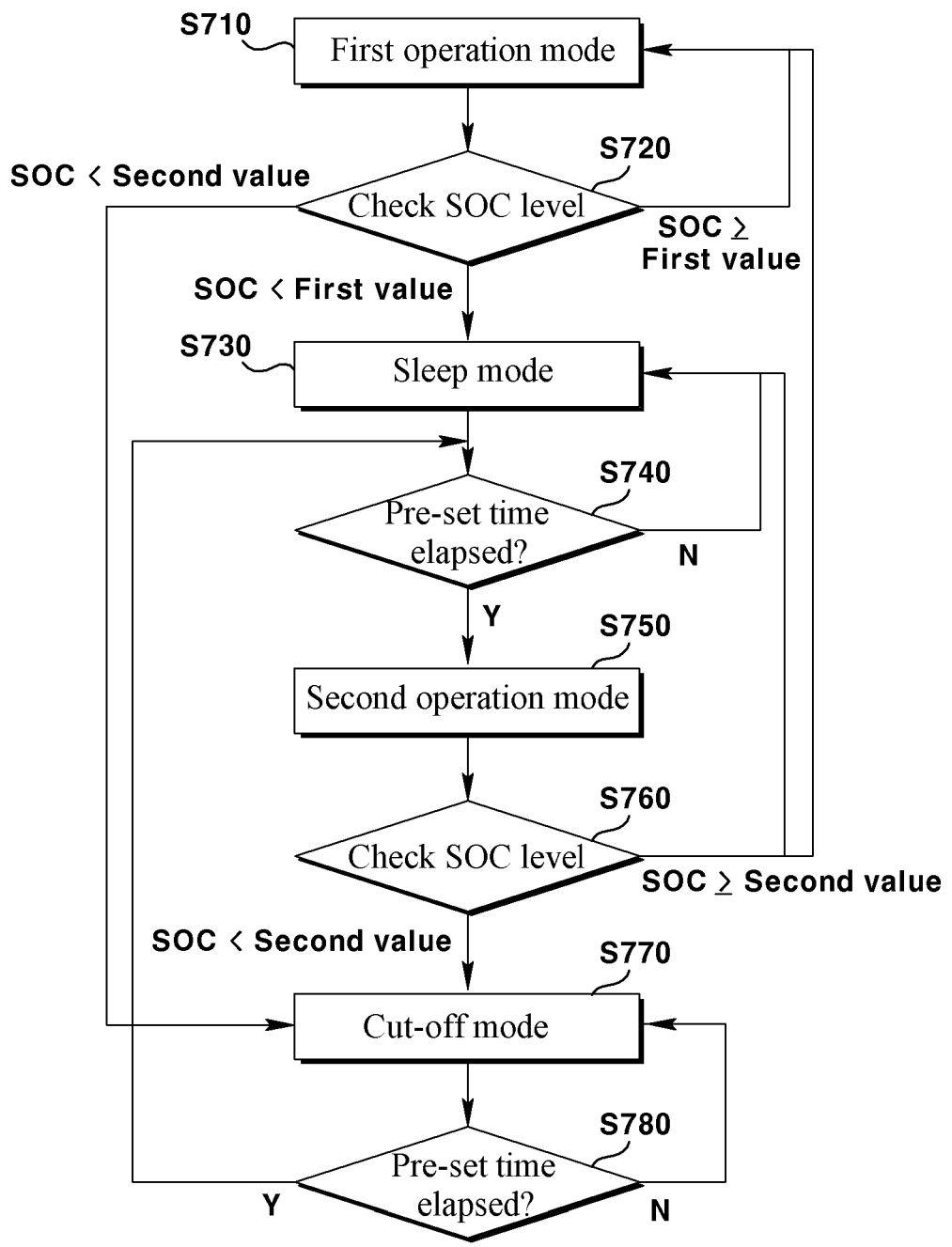
FIG. 7 is a flowchart illustrating an example of switching to a sleep mode and a cut-off mode according to another embodiment.

For example, FIG. 7 is a flow chart for describing an example of switching to a sleep mode and a cut-off mode according to another embodiment.

Steps S710 to S770 in FIG. 7 correspond to S610 to S670 of FIG. 6, respectively, so a description of overlapping contents will be omitted, and differences will be described in detail.

In step 710, the DC-DC converter 100 operates in a first operation mode.

In step S720, the DC-DC converter 100 checks the SOC level and switches to a sleep mode (S730) when the SOC level is smaller than a first value, and when it is smaller than a second value, it is possible to immediately switch to a cut-off mode (S670).

In step S740, when a preset time (for example, 6 hours) elapses in a state of a sleep mode, the DC-DC converter 100 temporarily proceeds to step S650 to switch to a second operation mode, and proceeds to step S760 to check the SOC level again. In a state of a sleep mode, since the battery management system (BMS) is deactivated to minimize power consumption, only the BMS function can be temporarily activated to check the SOC level in the second operation mode.

When the value of the SOC level measured at this time is smaller than a second value, the DC-DC converter proceeds to step S770 to switch to a cut-off mode. Also, when the SOC level is smaller than the first value but larger than the second value, it may be switched to a sleep mode again. Further, when the SOC level is greater than a first value, it may be switched to a first operation mode (S710).

In a DC-DC converter 100 according to an embodiment, as a result of checking the SOC level in step S760, may be operated in a cut-off mode when the SOC level is smaller than a first value, a sleep mode when it is smaller than a first value but greater than or equal to a second value, and a first operation mode when it is greater than or equal to a first value.

Or, A DC-DC converter 100 according to an embodiment, as the result of checking the SOC level in step S760, may operate in a cut-off mode when the SOC level is smaller than a second value and in a sleep mode when it is greater than or equal to the second value. In this case, the DC-DC converter 100 checks the SOC level in a sleep mode, and may operate in a first operation mode when the SOC level is sufficiently high (for example, the SOC level is greater than or equal to a first value).

Meanwhile, in a cut-off mode (S770), when all voltages inputted to a DC-DC converter 100 are physically cut-off, the DC-DC converter cannot be operated any more, and therefore the mode may not be switched from the cut-off mode to a first operation mode or a sleep mode.

However, a DC-DC converter according to an embodiment may be designed in a way that by maintaining a clock count function of the DC-DC converter 100 even in a cut-off mode (S770), the remaining amount of the battery value at preset time intervals (S780) is measured to re-enter into a sleep mode or re-enter in to a sleep mode when the remaining amount value of the charge changes due to temperature changes and the like.

Or, when more than a predetermined amount of power is inputted from the solar power supply, the DC-DC converter automatically determines that the battery is in a chargeable state due to an inputted power supply, and exits the cut-off mode and switches the circuit breaker into a closed state again so as to supply power to the battery. For example, the DC-DC converter may be designed in a way that when it determines that the battery is in a chargeable state, it is automatically switched back to a sleep mode (S730) or a first operation mode (S710).

Further, through communication with the inverter, the DC-DC converter 100, even while operating in a sleep mode or a cut-off mode, determines whether the current state is a state in which the battery can be charged, and when it is in a possible state, it may also immediately switch to a first operation mode.

Figure 8:
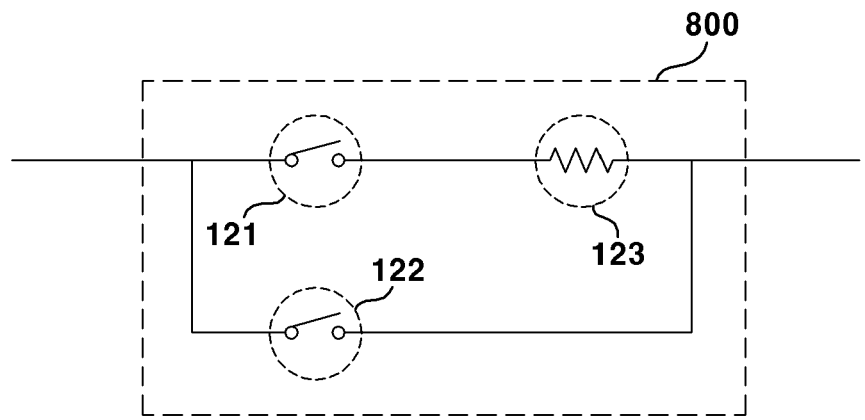
FIG. 8 is a diagram illustrating an example of implementing a switch in a cut-off mode according to an embodiment.

FIG. 8 is a diagram illustrating an example of implementing a switch 800 in a cut-off mode according to an embodiment. The switch 800 may be included in a circuit breaker 140, or the switch 800 may be used to connect the circuit breaker 140 and the battery 160.

Referring to FIG. 8, a switch 800 according to an embodiment may comprise a first line comprising a first switch 121 and a resistor 123 connected in series with the first switch 121, and a second line connected in parallel with the first line and comprising a second switch 122.

As illustrated in FIG. 8, when the switch 800 is configured in two stages, it may be provided with a structure that prevents the elements inside the switch 800 (e.g., the first switch 121 and the second switch 122) from being damaged by a high current, and each of the first switch 121 and the second switch 122 may be implemented as a single FET so as not to block the current charged by the battery.

As another example, each of the switches 121 and 122 may be implemented with two FETs to pass current discharged from the battery. When the switches 121 and 122 are implemented with two FETs, the diode directions of each FET may be located in the directions opposite from each other.

Such an operation of the switch 800 may be controlled by a processor 130 according to an embodiment, and the battery may enter into a cut-off mode to prevent over-discharging. In addition, it may be designed in a way that, even in a cut-off mode, the switch can be automatically closed to proceed to a sleep mode when power is inputted from the solar power supply 10.

Figure 9:
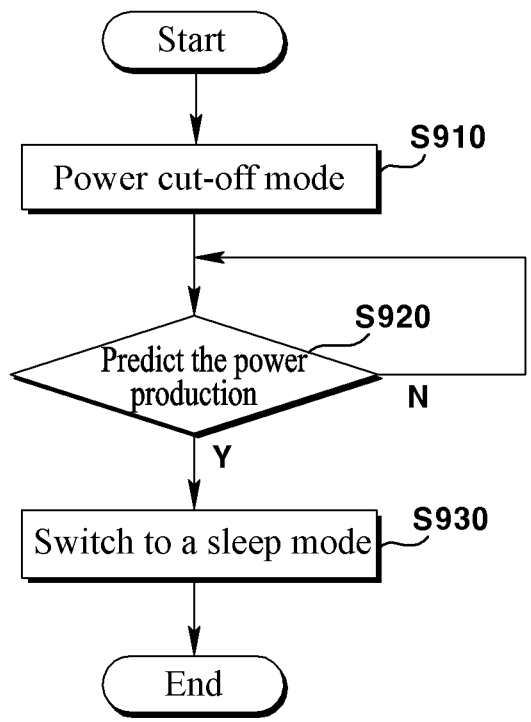
FIG. 9 is a diagram illustrating an example of releasing a sleep mode or a cut-off mode based on a change in the amount of sunlight or a change in weather, according to an embodiment.

FIG. 9 is a diagram illustrating an example of releasing a cut-off mode based on a change in the amount of sunlight or a change in weather, according to an embodiment.

Referring to FIG. 9, in step S910, the circuit breaker is operated based on the SOC level so that the solar power generation system may enter into a power cut-off mode.

In step S920, the solar power generation system may predict the amount of electricity generated according to the change in weather and the change in the amount of sunlight based on data collected from the data of Korea Meteorological Administration or a solar panel. For example, when the current time is 7 am and it is predicted that the solar panel will generate power in consideration of the season and the weather, it enters into step S930 to switch to a sleep mode.

However, when the amount of sunlight is still insufficient and power production is not predicted, it is possible to maintain a power cut-off mode and determine whether power production is predicted at a preset time period. Of course, the solar power generation system can control the DC-DC converter of the battery pack so that the sleep mode is also released when the SOC level rises above a preset value.

Figure 10:
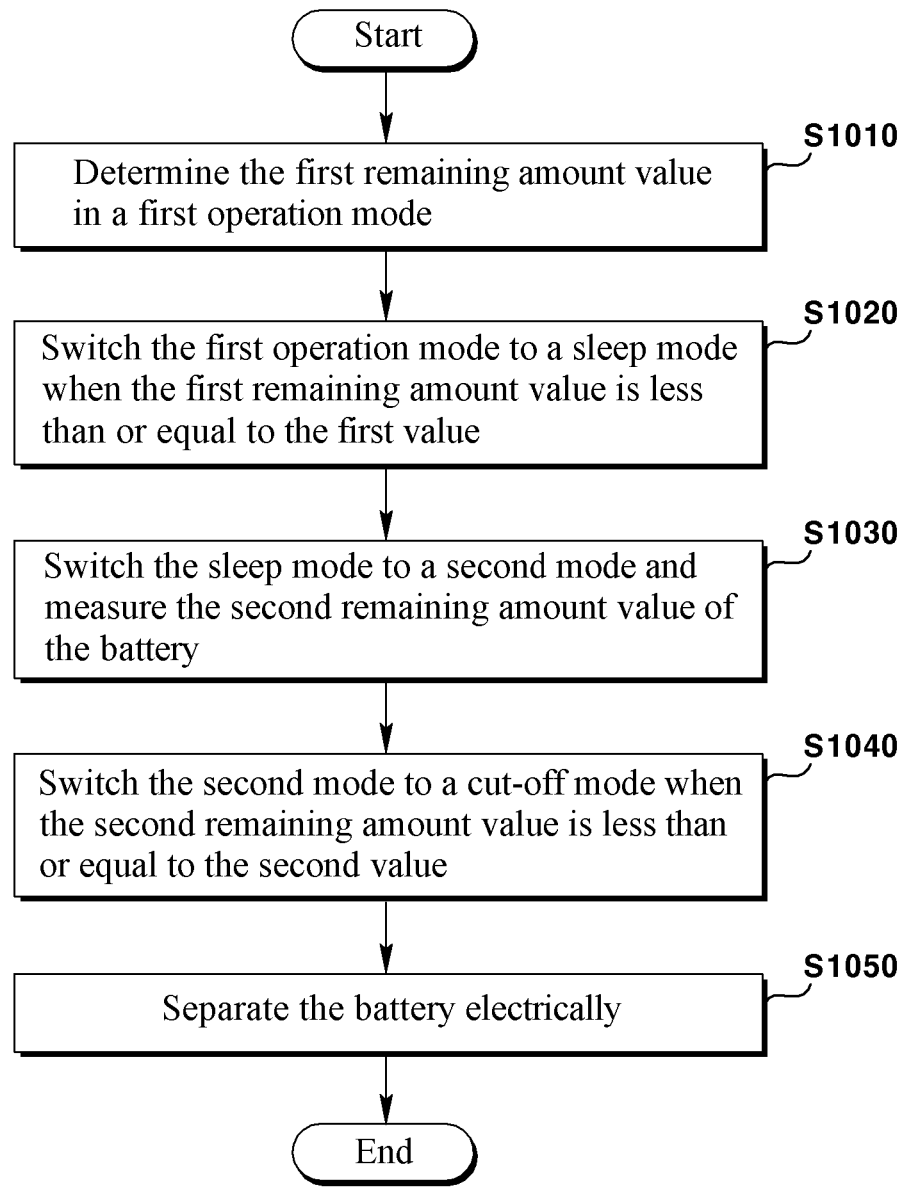
FIG. 10 is a flowchart illustrating a method of controlling a DC-DC converter according to an embodiment.

FIG. 10 is a flowchart illustrating a method of controlling a DC-DC converter according to an embodiment. Referring to FIG. 10, the DC-DC converter control method comprises steps that are processed in time series by a DC-DC converter comprising the reverse wiring protection device 100 illustrated in FIGS. 2, 3, and 4. Accordingly, it can be seen that the contents described above regarding the reverse wiring protection apparatus 100 illustrated in FIGS. 2, 3, and 4 are also applied to the method illustrated in FIG. 10 even when omitted hereinafter.

In step S1010, the DC-DC converter determines a first remaining amount value of the battery in a first operation mode. Here, the first operation mode means a general operation mode in which the battery can be charged and discharged, and a first value may mean that the remaining amount of the charge of the battery obtained through BMS is less than 5%.

In step S1020, when a first remaining amount value is less than or equal to a first value, the DC-DC converter switches a first operation mode to a sleep mode. Here, the sleep mode may be a mode for reducing power consumption by deactivating functions other than a function required for communicating with an inverter among a plurality of functions activated in the first operation mode.

In step S1030, the DC-DC converter switches from a sleep mode to a second operation mode and measures the second remaining amount value of the battery. Here, the second remaining amount value means a value measured in a second operation mode, and the second value is smaller than the first value. In addition, as in the sleep mode, the second operation mode may mean a mode in which the remaining amount value of the battery can be measure by activating the BMS instead of deactivating at least one of an analog-digital converter (ADC) sensing function, a PWM (Pulse width modulation) function, and a protection function.

In addition, the second value may mean that the remaining amount of the charge of the battery obtained through BMS is 0% or less. Here, the second value may mean a value designed to be displayed to a user as 0% when an actual remaining amount of about 3% remains to prevent complete discharging of the battery.

In step S1040, when the second residual amount value is less than or equal to a second value, the DC-DC converter switches the second operation mode to a cut-off mode.

In step S1050, the DC-DC converter electrically disconnects the battery. Therefore, the damages due to an over-discharging of the battery can be minimized. Meanwhile, even when the DC-DC converter enters into a cut-off mode, it may be designed to switch back to a sleep mode or a first operation mode when a preset condition is satisfied. The preset condition may be simply a certain time interval, and further, may be designed to detect or predict that power is inputted through the solar power supply.

Meanwhile, the above-described method can be written as a program that can be executed on a computer, and can be implemented in a general-purpose digital computer that operates the program using a computer-readable recording medium. In addition, the structure of the data used in the above-described method can be recorded on a computer-readable recording medium through various means. The computer-readable recording medium includes storage media such as magnetic storage media (for example, ROM, RAM, USB, floppy disk, hard disk, and the like), optical reading media (for example, CD-ROM, DVD, and the like).

It will be understood by a person of ordinary skill in the art related to the present embodiment that it may be implemented in a modified form within a scope not departing from the essential characteristics of the above description. Therefore, the disclosed methods should be considered from an explanatory point of view rather than a limiting point of view. The scope of the present invention is illustrated in the claims rather than the foregoing description, and all differences within the scope equivalent thereto should be construed as being included in the present invention.

The invention claimed is:

1. A DC-DC converter comprising:
an input unit receiving power;
an output unit converting the power of the input unit and supplying it to a battery;
a processor configured to determine a mode according to a state of the battery; and
a circuit breaker electrically connecting to or disconnecting from the battery according to the mode,
wherein the processor is configured to:
measure a first remaining amount value of the battery in a first operation mode,
switch the first operation mode to a sleep mode when the first remaining amount value is less than or equal to a first value,
switch the sleep mode to a second operation mode to measure a second remaining amount value of the battery, and
switch the second operation mode to a cut-off mode when the second remaining amount value is less than or equal to a second value,
wherein the circuit breaker separates the battery from the output unit electrically in the cut-off mode of the processor,
wherein the second value is smaller than the first value, and
wherein the second operation mode is switched to the sleep mode when the second remaining amount value of the battery is greater than the second value and less than or equal to the first value.

2. The DC-DC converter according to claim 1, wherein the first operation mode is switched to the cut-off mode when the first remaining amount value of the battery is less than or equal to the second value.

3. The DC-DC converter according to claim 2, wherein the second operation mode is switched to the first operation mode when the second remaining amount value of the battery is greater than the first value.

4. The DC-DC converter according to claim 1, wherein the sleep mode is a mode to reduce power consumption by deactivating functions other than a function required for communication with an inverter among a plurality of functions activated in the first operation mode.

5. The DC-DC converter according to claim 4, wherein the processor is configured to switch to the first operation mode and supply power to the battery when the current state is a state in which the battery is chargeable based on communication with the inverter while the battery is operating in the sleep mode or the cut-off mode.

6. The DC-DC converter according to claim 5, wherein the processor is configured to determine the current state as the state in which the battery is chargeable when more than a predetermined amount of power is supplied from the solar power supply.

7. The DC-DC converter according to claim 5, wherein the processor is configured to switch a state of the circuit breaker in cut-off state into a connected state to supply power to the battery when the current state is the state in which the battery is chargeable while operating in the cut-off mode.

8. The DC-DC converter according to claim 1, wherein the processor is configured to switch the sleep mode to the second operation mode according to a preset time interval.

9. The DC-DC converter according to claim 1, wherein the second value is a remaining amount value of the battery when the displayed remaining amount value of the battery is 0.

10. The DC-DC converter according to claim 1, wherein the second operation mode is a mode to deactivate at least one of an analog-digital converter (ADC) sensing function, a pulse width modulation (PWM) sensing function, and a protection function.

11. A control method of a DC-DC converter comprising:
determining a first remaining amount value of a battery in a first operation mode;
switching the first operation mode to a sleep mode when the first remaining amount value is less than or equal to a first value;
switching the sleep mode to a second operation mode to measure a second remaining amount value of the battery;
switching the second operation mode to the sleep mode when the second remaining amount value of the battery is greater than the second value and less than or equal to the first value;
switching the second operation mode to a cut-off mode when the second remaining amount value is less than or equal to a second value; and
separating the battery electrically,
wherein the second value is smaller than the first value.

12. The control method of a DC-DC converter according to claim 11, comprising switching the first operation mode to the cut-off mode when the first remaining amount value of the battery is less than or equal to the second value.

13. The control method of a DC-DC converter according to claim 11, comprising switching the second operation mode to the first operation mode when the second remaining amount value of the battery is greater than the first value.

14. The control method of a DC-DC converter according to claim 11, wherein the sleep mode is a mode to reduce power consumption by deactivating functions other than a function required for communication with an inverter among a plurality of functions activated in the first operation mode.

15. The control method of a DC-DC converter according to claim 14, comprising switching the sleep mode or the cut-off mode to the first operation mode and supplying power to the battery when the battery is chargeable based on communication with the inverter.

16. The control method of a DC-DC converter according to claim 11, comprising connecting the battery electrically when the battery is chargeable while operating in the cut-off mode.

17. The control method of a DC-DC converter according to claim 11, comprising switching the sleep mode to the second operation mode according to a preset time interval.

18. A DC-DC converter comprising:
an input unit receiving power;
an output unit supplying the power of the input unit to a battery; and
a processor configured to:
measure a first remaining amount value of the battery in a first operation mode,
switch the first operation mode to a sleep mode when the first remaining amount value is less than or equal to a first value,
switch the sleep mode to a second operation mode to measure a second remaining amount value of the battery, and
switch the second operation mode to a cut-off mode when the second remaining amount value is less than or equal to a second value,
wherein the battery is separated electrically from the output unit in the cut-off mode of the processor, and
wherein the second operation mode is switched to the sleep mode when the second remaining amount value of the battery is greater than the second value and less than or equal to the first value.

* * * * *